Figure 1:
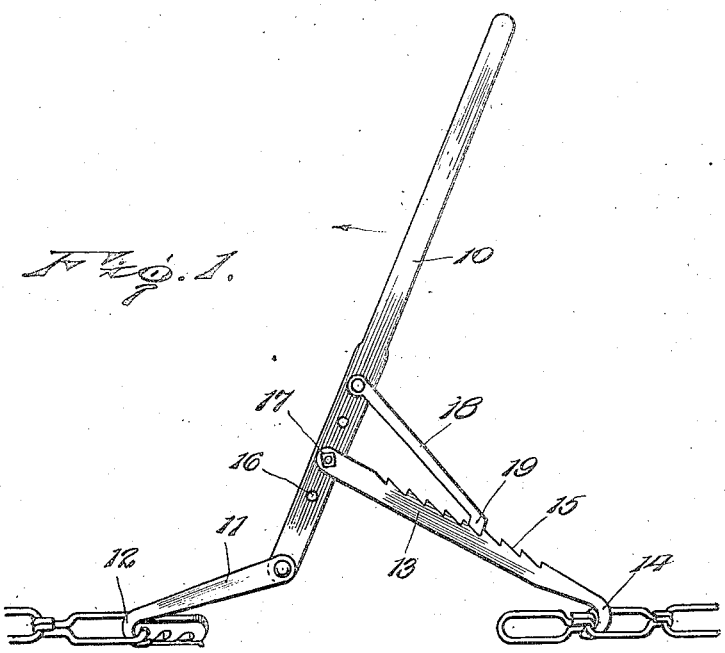

April 1, 1924.

O. P. HULSE 1,488,600

CHAIN TIGHTENER

Filed April 13, 1921

Inventor
O. P. Hulse
By T. H. Johnston
Attorney

Patented Apr. 1, 1924.

1,488,600

UNITED STATES PATENT OFFICE.

OSCAR P. HULSE, OF DUFUR, OREGON.

CHAIN TIGHTENER.

Application filed April 13, 1921. Serial No. 460,947.

*To all whom it may concern:*

Be it known that I, OSCAR P. HULSE, citizen of the United States, residing at Dufur, in the county of Wasco and State of Oregon, have invented certain new and useful Improvements in Chain Tighteners, of which the following is a specification.

This invention relates to an improved chain tightener, being particularly designed for use in tightening non-skid chains about automobile tires or in tightening sprocket chains, drive belts, and the like, and has as one of its principal objects to provide a device of this character which may be readily operated for tightening a chain and may then be locked for holding the chain taut so that both hands of the operator may be used for connecting the ends of the chain.

The invention has as a further object to provide a device employing a lever which may be adjustably swung for tightening the chain and may then be locked in adjusted position for maintaining the desired tension upon the chain until the ends of the chain are connected.

And the invention has as a still further object to provide a device which will be simple in its construction and which will be composed of few and simple parts so that, in practical use, the device will not be likely to get out of order.

Other and incidental objects will appear hereinafter.

Figure 2:
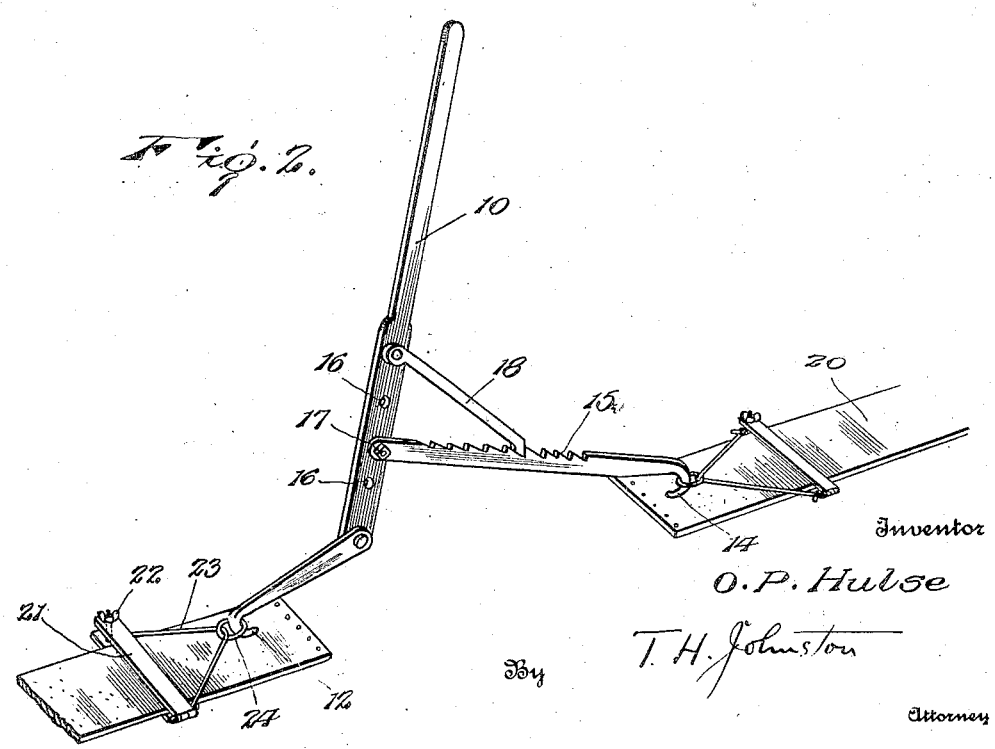

In the drawing:

Figure 1 is a side elevation showing my improved device in connection with an ordinary tire chain, and Figure 2 is a perspective view showing the use of the device for tightening a belt.

In carrying the invention into effect, I employ a lever 10 widened at its lower end portion and pivotally connected to the lever at its lower end is a dog 11 provided at its outer end with a hook 12. Swingingly mounted upon the lever to coact with the dog 11 is a somewhat longer dog 13, lying at the same side of the lever with the former dog and provided at its outer end with a hook 14. At its upper edge the dog 13 is provided with a rack 15. The flattened portion of the lever is provided with a series of openings 16 and selectively engageable through said openings is a bolt 17 pivotally connecting the dog 13 with the lever, the series of openings providing a means whereby the dog may be adjustably connected to the lever. Pivoted upon the lever above the inner end of the dog 13 is a pawl 18 provided at its outer end with a substantially V-shaped head 19 to coact with the rack 15. As will be perceived, the device is very simple in its construction, being possessed of but very few parts.

In Figure 1 of the drawing, I have shown the improved tightener in connection with one of the side members of an ordinary automobile non-skid chain, the side member being itself in the form of a chain. As will be observed, the hook 12 of the dog 11 is engaged with one of the links near one end of the chain while the hook 14 of the dog 13 is engaged with one of the links near the other end of the chain. This done, the lever 10 may then be swung, as will be readily appreciated, for drawing the ends of the side member together and tightening the non-skid chain about the wheel tire when the pawl 18 may then be swung into position coacting with the rack 15 of the dog 13 for locking the lever against retrograde movement and holding the chain tightened. Accordingly, both hands of the operator may then be used for connecting the ends of the chain. As will be perceived, the fact that the lever 10 may be locked provides a very convenient feature of the present invention and is of great importance or practically imperative where the device is to be used for tightening sprocket chains on machinery such, for instance, as a threshing machine. In any such instance, it is practically impossible to accomplish the operation of connecting the ends of a sprocket chain with one hand. Accordingly, a device which does not embody a locking means of some description whereby the sprocket chain may be held taut after being tightened, would be of no use. In contrast, the present invention provides an adequate means for locking the lever 10, after being swung, so that the device will not only be well adapted for use in tightening non-skid chains but will also be adapted for tightening sprocket chains and drive belts. The hooks 12 and 14 of the dogs 11 and 13 of the device are turned downwardly beneath said dogs so that when the device is used for tightening a sprocket chain no additional clearance will be necessary to accommodate the hooks. Furthermore, as will be noted, both of the dogs and the pawl are mounted at the same side of the lever so that the pawl and the shorter dog will limit swinging movement of the longer dog in opposite directions to maintain the longer dog in operative position with respect to the pawl extending at the rear of the lever.

In Figure 2 of the drawings, I have shown the use of the device as a belt tightener, an ordinary belt being conventionally illustrated at 20. For this purpose, companion clamps are provided. Each of said clamps comprises a pair of pivotally connected clamping bars 21 adapted to embrace the belt and adjustably connecting said bars at their free ends is a clamping bolt 22. Extending from each pair of bars is a sling 23 carrying a ring 24. One of the clamps is, of course, arranged near one end of the belt while the other of the clamps is arranged near the other end of the belt so that the hooks 12 and 14 of the dogs 11 and 23 of the device may be engaged through the rings 24 and the lever 10 operated for drawing the ends of the belt together. The pawl 18 may then be moved to coact with the rack 15 of the dog 13 for locking the lever aginst retrograde movement, when both hands of the operator will be free for lacing the belt. I accordingly provide a tightener of thoroughly efficient design and a device which, in practical use, will prove highly advantageous for the purposes indicated.

Having thus described the invention, what is claimed as new is:

In a chain tightener, the combination of a lever straight from end to end, rigid dogs of unequal length pivoted at their inner ends to the lever in vertical spaced relation, the dogs being straight from end to end and provided at their outer ends with integral downturned hooks each tapered to a point, the longer dog being above the shorter dog and provided at its upper edge with a rack, and a pawl pivoted at one end upon the lever above the longer dog to coact at its free end with said rack for locking the lever against retrograde movement, the dogs and said pawl being free at their outer ends with respect to the lever for unrestricted swinging movement but having their inner ends held flat against the lever at the same side thereof whereby the pawl and said dogs will limit each other in their swinging movement in opposite directions to prevent reversal thereof with respect to each other.

In testimony whereof, I affix my signature.

OSCAR P. HULSE. [L. S.]